June 24, 1947.   R. H. SACHTLEBER   2,422,931
MEASURING INSTRUMENT
Filed Oct. 27, 1944   2 Sheets-Sheet 1
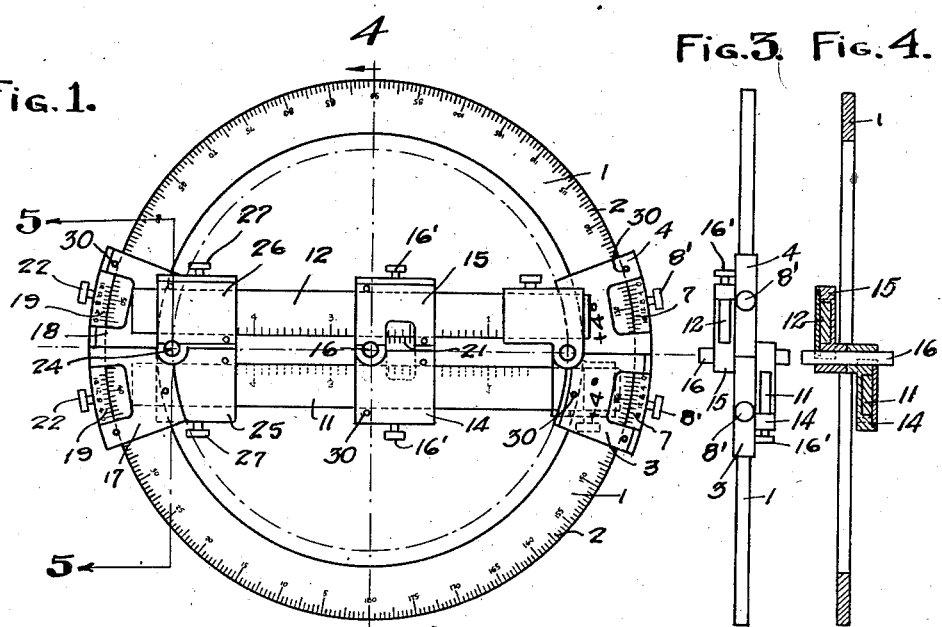
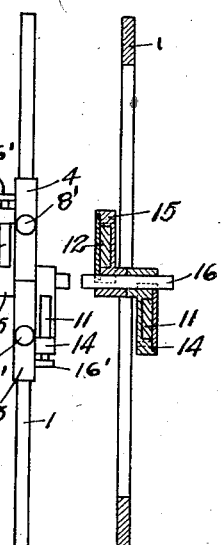
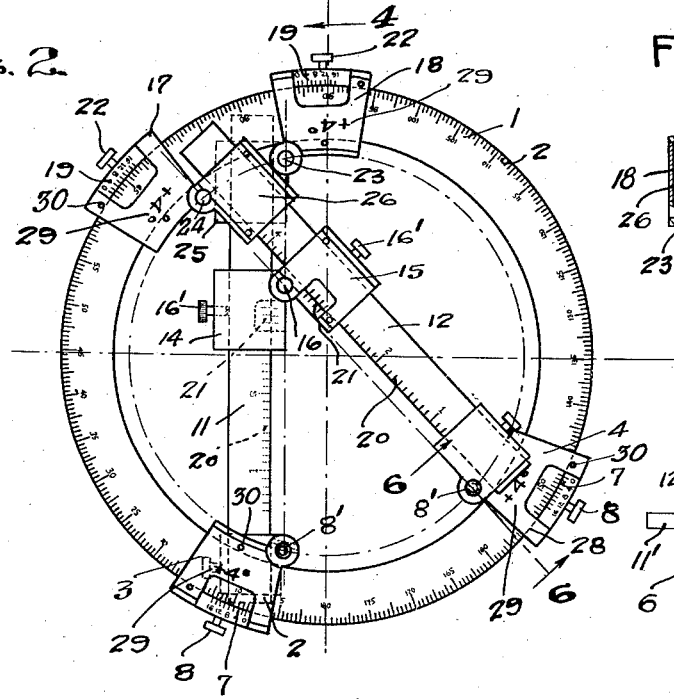
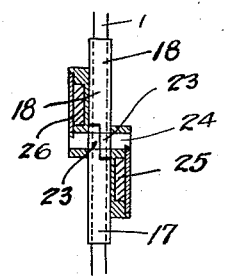
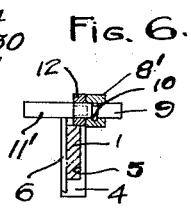
Rudolph H. Sachtleber
INVENTOR
BY
ATTORNEY Rudolph H. Sachtleber
INVENTOR.

BY [signature]
Attorney

Patented June 24, 1947

2,422,931

UNITED STATES PATENT OFFICE 2,422,931

MEASURING INSTRUMENT

Rudolph H. Sachtleber, East Orange, N. J.

Application October 27, 1944, Serial No. 560,549

4 Claims. (Cl. 33—98)

This invention relates to an instrument for measuring or determining in degrees the unknown sides and angles of triangles.

An object of the present invention is the provision of a measuring instrument with which when the degree of one angle and the length of two sides, or the degrees of two angles and the length of one side of a triangle are known, the degree and length of the unknown angle or angles of the side may be quickly determined with comparative ease by setting of the instrument and reading from the scales thereon.

With these and other objects in view, as may appear from the accompanying specification, the invention consists of various features of construction and combination of parts, which will be first described in connection with the accompanying drawings, showing a measuring instrument of a preferred form embodying the invention, and the features forming the invention will be specifically pointed out in the claims.

In the drawings:

Figure 1 is a plan view of the improved instrument.

Figure 2 is a plan view of the instrument showing it set to determine the reading of the unknown sides or an angle of a triangle.

Figure 3 is an edge elevation of the instrument.

Figure 4 is a cross section taken on the line 4—4 of Figure 1.

Figure 5 is a cross section taken on the line 5—5 of Figure 1.

Figure 6 is a detail section taken on the line 6—6 of Figure 2.

Figure 7:
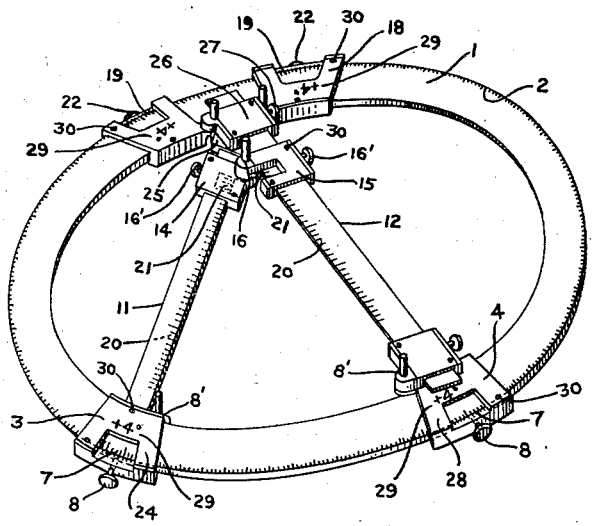
Figure 7 is a perspective view of the instrument.

Referring more particularly to the drawings, the improved measuring instrument includes a carrying-ring 1 which has one face thereof about its outer perimeter graduated with a scale, as shown at 2, to indicate 180°. The ring 1 has a pair of slides 3 and 4 slidably mounted thereon, and since the ring 1 is a solid unbroken ring, the slides 3 and 4 are provided with cut out portions 5 for receiving the ring and with removable plates 6 which are shown in Figure 6 of the drawings to be dovetailed into the main body of the slide so that they may be removed for removing the slide from the ring. Each of the slides 3 and 4 has a vernier scale 7 thereon which cooperates with the graduated scale 2, and each of them also carries a thumb screw 8 which may be threaded into contact with the perimeter of the ring 1 to hold the slides in various adjusted positions.

Each of the slides 3 and 4 has a laterally offset boss 8' formed thereon at its inner corner so that when the slides are mounted on the ring the two bosses will be facing each other. Pins 9 are carried by the bosses 8 for rotary movement in the bosses and are held against longitudinal movement in the bosses by pins 10. The pins 9 are drilled at their upper ends to receive the reduced ends of measuring pins 11', the use of which will be brought out later herein in describing the method of measuring or determining the unknown sides or angles of a triangle. Defining and measuring bars 11 and 12 are pivotally connected by means of the pins 9 to the slides 3 and 4, respectively, and these measuring and defining bars extend across the ring 1, as clearly shown in both Figures 1 and 2 of the drawings.

Slides 14 and 15 are slidably carried by the bars 11 and 12 and are pivotally connected to each other by a pin 16. Thumb screws 16' are carried by the slides 14 and 15 for anchoring them in adjusted positions upon the bars 11 or 12, respectively. When one of the slides 14 or 15 is moved to a predetermined adjusted position upon its bar and anchored there with the other slide free to move along its carrying bar, both bars will move in unison when either of the bars is moved, and the slide which is not anchored will at such time move along its carrying bar. When both slides are released for sliding movement on their carrying bar, the movement of either of the measuring bars will move the slide along the other bar without effecting movement of the bar.

A second set of slides 17 and 18 which are quite similar to the slides 3 and 4 is carried by the ring 1, and these slides have vernier graduations 19 thereon for cooperating with the graduated scale 2 on the ring. The graduated scale 2 on the ring 1 and the verniers 7 and 19 on the slides 3, 4, 17 and 18 indicate various degrees while the bars 11 and 12 have graduated scales 20 thereon to indicate inches. The slides 14 and 15 have vernier scales 21 thereon for cooperation with the inch indicating scales 20.

The slides 17 and 18 are slidable about the ring 1 and are held in adjusted positions by means of thumb screws 22, and these slides have laterally offset bosses 23 formed on their inner facing corners, which bosses are cut away so as to overlap and provide registration or alignment of the bores therein for receiving a connecting pin 24, which connecting pin 24 serves either to connect the two slides 17 and 18 or to connect the connecting slides 25 and 26 to the slides 17 and 18, respectively. The connecting slides 25 and 26 are slidably carried by the bars 11 and 12 on the opposite side of the slides 14 and 15 forming pivotal connections of the bars 11 and 12 with the slides 3 and 4. Thumb screws 27 are carried by the slides 25 and 26 for anchoring them in adjusted positions upon the bars 11 and 12.

All of the slides 3, 4, 14, 15, 17, 18, 25, and 26 have removable side plates dovetailed or otherwise suitably connected thereto, similar to the side plate 6 all of which plates are secured to the respective slides by screws 30.

In measuring the unknown angle of a triangle in degrees, it is necessary to add to the readings indicated by the scale 2 and the vernier scales a predetermined number of degrees corresponding to the width of the blank ring enclosed by arms 28 of the slides to provide an accurate reading, and in the making of the instrument each of the slides will be provided with indicia such as indicated at 29 to specify the exact number of degrees to be added.

Figure 8:
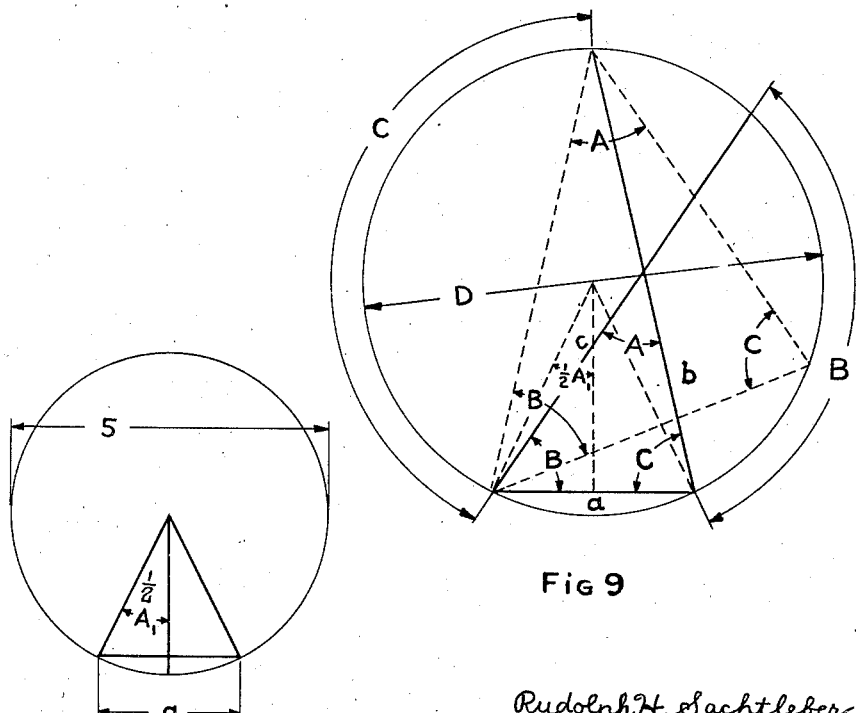

In measuring the sides of a triangle a selected side, assuming that it is stated in inches, can be converted to degrees by dividing this side, as at "$a$" in Figure 8, by the diameter of the circle in which the pins 9, 11', 23 and 24 travel. This will give the sine of ½ of the angle so that from a book of trigonometrical tables the sine of the angle may be converted to degrees, and this value will give the full angle in degrees. Thus $$\frac{a}{5} = \text{sine } \tfrac{1}{2}A_1$$

The foregoing calculation constitutes a starting point and it could have been arrived at by the use of a micrometer.

Figure 9:
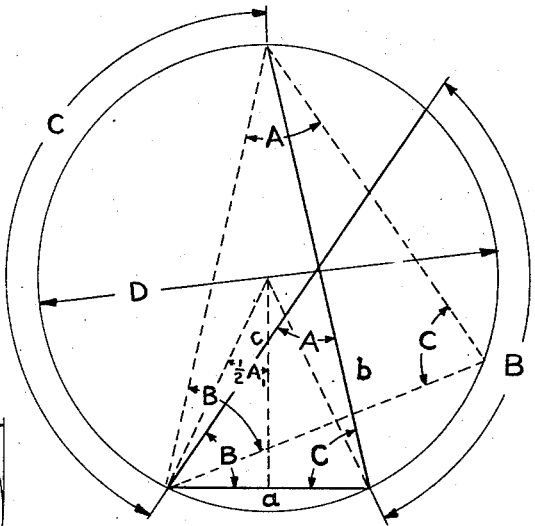
Figures 8 and 9 are diagrams illustrating the manner in which calculations are made with the instrument.

Having thus determined one of the sides of the triangle, the side $b$, as in Figure 9, is determined on the instrument by adjusting the slides 4 and 18 so that angle between them will read angle B, as in Figure 9, plus 2×4 degrees, as indicated by the indicia 29, to compensate for the vernier setting, which is allowed to arrive at the correct reading. The scale or degree reading on ring 1 is divided or arranged so as to read in terms of 180°, which represents the sum of the angles contained within a triangle, with the vernier scales showing accurate readings in degrees and minutes. The foregoing calculations have established angle B of one of the sides, which could also have been determined by the use of a micrometer, by reading and adding in one half of the diameters of the pins 9 and 23. Readings may be taken from either side of the instrument when using a micrometer. The pins 11' and 24 are made removable so that the instrument may be adjusted to the position shown in Figure 1, wherein the arms 11 and 12 are arranged in parallel relationship.

The other side $c$ is determined in the same manner as in connection with the side $b$ of the triangle. Thus the angle between the slides 3 and 17 of Figure 2 is set to the angle C of Figure 9 plus 8 degrees. The angle A is arrived at by subtracting B plus C from 180°, as in Figure 9. The sides $a, b, c$ are read in inches from the arms 11 and 12, and by their associated verniers to .001", or in degrees, which applies to the pins 9 or 11' and 16 only.

The other two sides of the triangle given are arrived at on the instrument by the slides 17 and 18. Thus one angle in degrees could be read between the slides 4 and 18 by subtracting the 8 degrees which are allowed for the vernier reading. If the side is given in inches, the slide 15 on the arms 12 may be set to inches and to the vernier reading. The last arm of the triangle is arrived at in a similar manner on the opposite side of the instrument by setting the slides 3 and 17 so that the angle between them will read in the degrees and minutes given, allowing 8 degrees for the vernier setting if the problem is stated in inches, and proceed in the manner previously mentioned and as illustrated in Figure 9.

It will be understood that the invention is not to be limited to the specific construction or arrangement of parts shown, but that they may be widely modified within the invention defined by the claims.

What is claimed is:

1. In an instrument for determining angles and sides of triangles, the combination of a ring having a 180° scale extending about the entire circumference of the ring to represent the sum of the angles within a triangle, two angle defining bars extending transversely of the ring and having sliding connections with said ring to coact with said scale, and means pivotally connecting said bars one with the other, said means being slidably connected with each of said bars between the sliding connections between the respective bars and said ring.

2. In an instrument for determining angles and sides of triangles, the combination of a ring having a 180° scale extending about the entire circumference of the ring to represent the sum of the angles within a triangle, two angle defining bars extending transversely of the ring and having sliding and pivotal connections with said ring to coact with said scale, said bars having linear scales, means pivotally connecting said bars one with the other, said means being slidably connected with each of said bars between the sliding connections between the respective bars and said ring and being arranged for coaction with said linear scales.

3. In an instrument for determining angles and sides of triangles, the combination of a ring having a 180° scale extending about the entire circumference of the ring to represent the sum of the angles within a triangle, two angles defining bars extending transversely of the ring and having sliding and pivotal connections with said ring to coact with said scale, said bars having linear scales, means pivotally connecting said bars one with the other, said means being slidably connected with each of said bars between the sliding connections between the respective bars and said ring and being arranged for coaction with said linear scales, said sliding connections and said means being provided with vernier scales respectively coactive with said 180° scale and said linear scales.

4. In an instrument for determining angles, and sides of triangles, the combination of a ring having a 180° scale extending about the entire circumference of the ring to represent the sum of the angles within a triangle, two angle defining bars extending transversely of the ring and having sliding and pivotal connections with said ring to coact with said scale, said bars having linear scales, means pivotally connecting said bars one with the other, said means being slidably connected with each of said bars between the sliding connections between the respective bars and said ring and being arranged for coaction with said linear scales, some of said sliding and pivotal connections and said means being provided with measuring pins.

RUDOLPH H. SACHTLEBER.

REFERENCES CITED

The following references are of record in the file of this patent:

UNITED STATES PATENTS

| Number | Name | Date |
|---|---|---|
| 1,821,870 | Addison | Sept. 1, 1931 |

FOREIGN PATENTS

| Number | Country | Date |
|---|---|---|
| 293,921 | Great Britain | July 19, 1928 |